United States Patent
Matsuura

(10) Patent No.: US 7,245,776 B2
(45) Date of Patent: Jul. 17, 2007

(54) IMAGE PROCESSING APPARATUS AND ITS METHOD, PROGRAM AND STORAGE MEDIUM

(75) Inventor: Tomohiko Matsuura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 10/941,879

(22) Filed: Sep. 16, 2004

(65) Prior Publication Data
US 2005/0036707 A1 Feb. 17, 2005

Related U.S. Application Data

(62) Division of application No. 09/986,252, filed on Nov. 8, 2001, now Pat. No. 6,823,090.

(30) Foreign Application Priority Data

| Nov. 9, 2000 | (JP) | ............................. 2000-342341 |
| Oct. 25, 2001 | (JP) | ............................. 2001-328064 |

(51) Int. Cl.
*G06K 9/46* (2006.01)

(52) U.S. Cl. ...................... 382/240; 382/260; 382/274; 382/275; 358/3.26; 358/3.27; 358/463

(58) Field of Classification Search ................ 382/260, 382/274, 275, 277, 240, 252, 263; 358/3.26, 358/3.27, 463, 520, 466
See application file for complete search history.

(56) References Cited

U.S. PATENT DOCUMENTS

| 5,619,030 | A | * | 4/1997 | Shiomi ..................... 250/201.1 |
| 5,619,998 | A | | 4/1997 | Abdel-Malek et al. . 128/660.07 |
| 5,742,355 | A | * | 4/1998 | De Haan et al. ............ 348/607 |
| 5,790,694 | A | | 8/1998 | Maruo ........................ 382/149 |
| 5,825,846 | A | * | 10/1998 | Aach et al. .................... 378/98 |
| 5,870,502 | A | | 2/1999 | Bonneau et al. ............ 382/249 |
| 5,953,439 | A | | 9/1999 | Ishihara et al. ............. 382/107 |
| 6,157,414 | A | * | 12/2000 | Sakamoto ................... 348/581 |
| 6,345,130 | B1 | * | 2/2002 | Dahl .......................... 382/286 |
| 6,498,863 | B1 | * | 12/2002 | Gaidoukevitch et al. .... 382/173 |
| 6,640,145 | B2 | * | 10/2003 | Hoffberg et al. .............. 700/83 |
| 6,741,739 | B1 | * | 5/2004 | Vincent ...................... 382/191 |
| 6,771,833 | B1 | * | 8/2004 | Edgar ......................... 382/254 |
| 6,823,090 | B2 | * | 11/2004 | Matsuura ..................... 382/275 |
| 6,850,252 | B1 | * | 2/2005 | Hoffberg ..................... 715/716 |

\* cited by examiner

*Primary Examiner*—Yosef Kassa
(74) *Attorney, Agent, or Firm*—Fitzpatrick, Cella, Harper & Scinto

(57) ABSTRACT

An object of this invention is to efficiently attain noise removal. In order to achieve the object, the discrete wavelet transforms of an input image are computed to output wavelet coefficients of respective subbands (S301). Appropriate threshold values are respectively set for subbands HL, LH, and HH indicating high-frequency components (S302a, S302b, S302c). The wavelet coefficients of the subbands HL, LH, and HH then undergo threshold value processes using the set threshold values for the respective subbands (S303a, S303b, S303c). Pixels to be processed in a coefficient conversion process are determined based on the threshold value processing results of the respective subbands (S304). The wavelet coefficients of the respective subbands corresponding to the pixels to be processed determined in step S304 undergo coefficient conversion (S305), and the converted transformation coefficients undergo inverse discrete wavelet transformation, thus reconstructing and outputting a noise-removed image (S306).

13 Claims, 5 Drawing Sheets

IMAGE PROCESSING APPARATUS AND ITS METHOD, PROGRAM AND STORAGE MEDIUM

This application is a divisional application of U.S. application Ser. No. 09/986,252, filed Nov. 8, 2001, now U.S. Pat. No. 6,823,090 now allowed.

FIELD OF THE INVENTION

The present invention relates to an image processing apparatus for changing an image and, more particularly, changing transformation coefficients upon frequency transformation, its method, a program, and a storage medium.

BACKGROUND OF THE INVENTION

With the recent advance of digital technologies, a radiation image is converted into a digital image signal, and that digital image signal undergoes an image process, thus displaying the processed signal on, e.g., a CRT or printing it out. Upon photographing a radiation image, the X-ray dose is preferably as small as possible in consideration of the influences on a patient. But an image sensed with a small X-ray dose contains many quantization noise components, which disturb diagnosis.

For this reason, processes for removing such noise have been conventionally examined. For example, a noise removal process using a simple median filter, a method of removing noise by extracting high-frequency components using a smoothed image, and the like are done. In recent years, a multiplex frequency process for removing noise by segmenting an input image into a plurality of frequency bands, and executing independent processes for respective frequency bands has been examined.

In a filter process for removing noise by extracting high-frequency components using a smoothed image, since a single frequency band is used, noise removal cannot be effectively made if noise components are distributed to a broad frequency band. To avoid this, a plurality of filters having different sizes (i.e., different frequencies) may be simultaneously used. However, computation cost required for the process increases considerably. In order to maintain optimal frequency characteristics of a filter for noise removal, filter size adjustment corresponding to an object is indispensable, resulting in poor versatility.

The above problems can be greatly reduced using the multiplex frequency process represented by, e.g., discrete wavelet transformation in noise removal. However, since the multiplex frequency process executes uniform frequency processes in all spatial directions, for example, it cannot distinguish an edge having a direction component from isolated point noise having no direction component, and it is difficult for that process to remove noise while preserving the edge.

The present invention has been made in consideration of the aforementioned problems, and has as its object to effectively execute noise removal.

SUMMARY OF THE INVENTION

In order to achieve the above object, for example, an image processing apparatus of the present invention comprises the following arrangement.

That is, an image processing apparatus comprises:

frequency transformation means for obtaining a plurality of subbands by computing frequency transforms of an image;

determination means for determining transformation coefficients in a subband to be changed using at least two subbands of the plurality of subbands obtained by the frequency transformation means; and coefficient conversion means for converting the transformation coefficients determined by the determination means, wherein the frequency transformation means reconstructs an image using transformation coefficients of all the subbands including the transformation coefficients converted by the coefficient conversion means.

The determination means further comprises:

threshold value setting means for setting threshold values for at least two subbands of the plurality of subbands obtained by the frequency transformation means; and threshold value processing means for executing a threshold value process of transformation coefficients in the subbands for which the threshold values are set by the threshold value setting means, using the threshold values, and the determination means determines the transformation coefficients in the subband to be changed using a threshold value processing result of the threshold value processing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
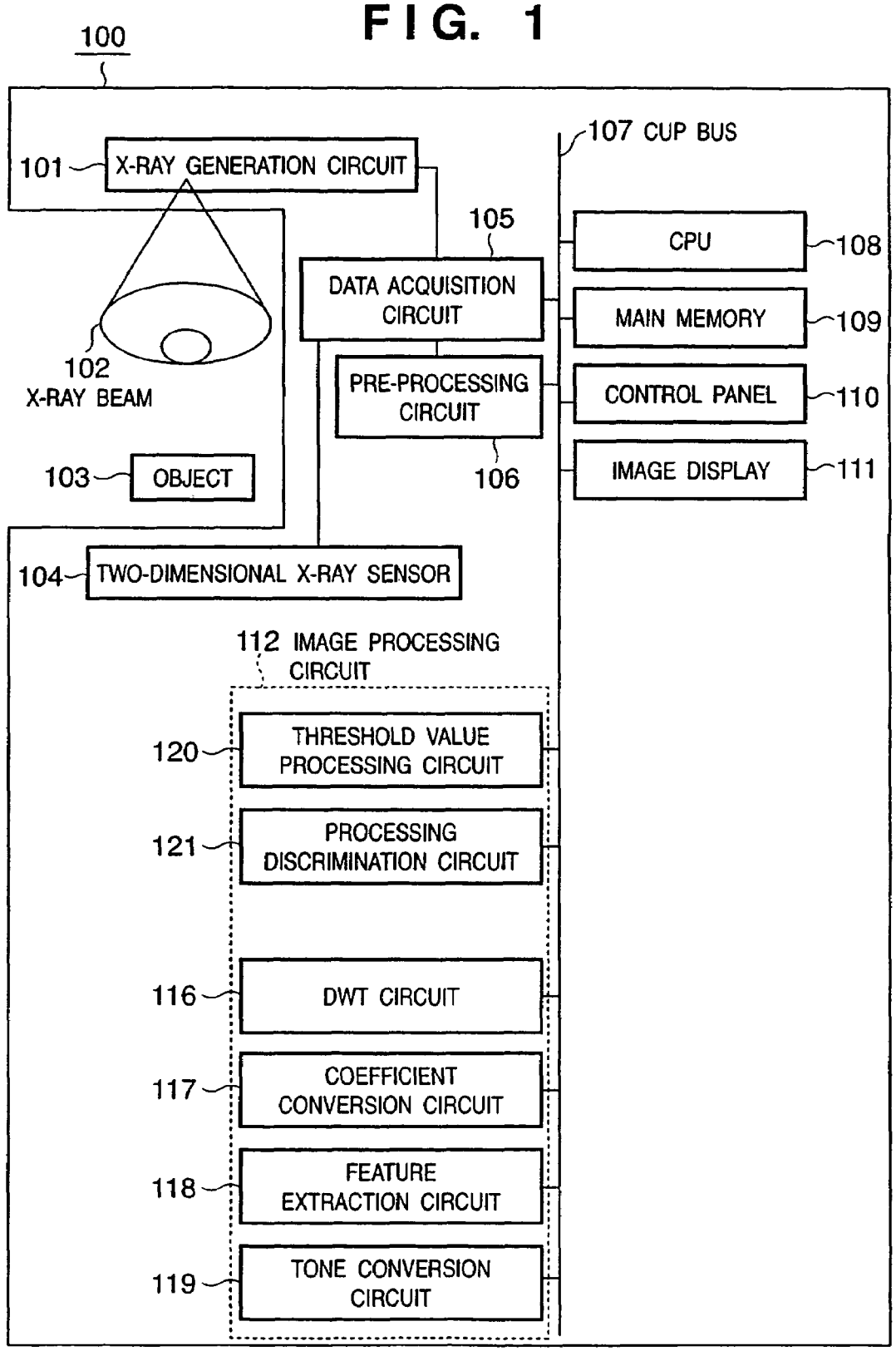
FIG. 1 is a block diagram showing the basic arrangement of an X-ray photographing apparatus according to the first embodiment of the present invention, and an object to be photographed using X-rays.

FIG. 1 shows the basic arrangement of an X-ray photographing apparatus 100 of this embodiment, and an object to be photographed using X-rays. An X-ray photographing apparatus 100 has a function of photographing an image of an object using X-rays, and removing noise from the photographed image, and comprises a pre-processing circuit 106, CPU 108, main memory 109, control panel 110, image display 111, and image processing circuit 112. Note that the image processing circuit 112 comprises a discrete wavelet transformation (DWT) circuit 116, coefficient conversion circuit 117, feature extraction circuit 118, tone conversion circuit 119, threshold value processing circuit 120, and processing discrimination circuit 121, which exchange data via a CPU bus 107.

The X-ray photographing apparatus 100 comprises a data acquisition circuit 105 connected to the pre-processing circuit 106, and a two-dimensional X-ray sensor 104 and X-ray generation circuit 101, which are connected to the data acquisition circuit 105, and these circuits are also connected to the CPU bus 107.

Figure 2:
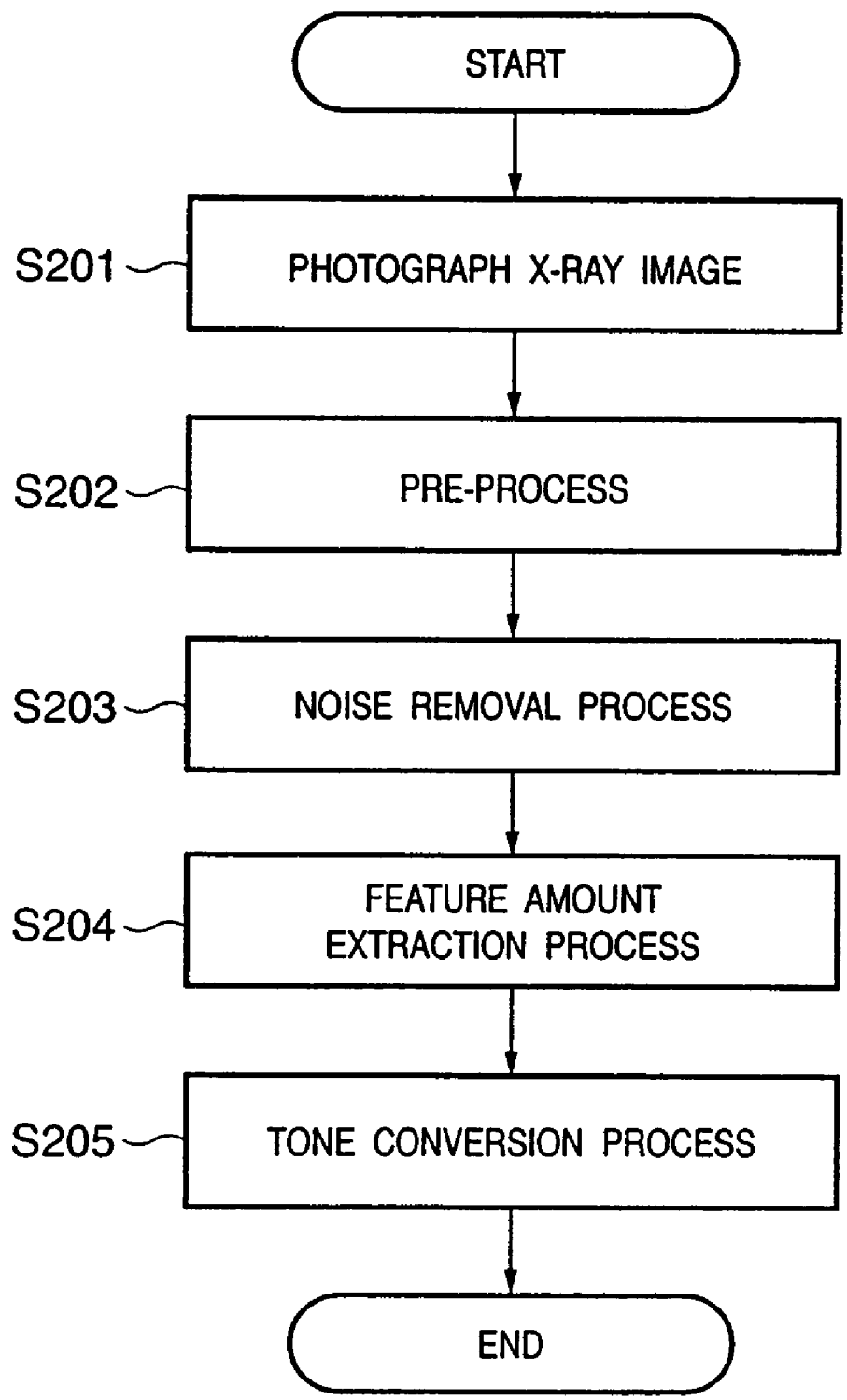
FIG. 2 is a flow chart showing an outline of processes done by the X-ray photographing apparatus according to the first embodiment of the present invention.

FIG. 2 is a flow chart showing an outline of processes executed by the X-ray photographing apparatus 100 of this embodiment with the above arrangement. Note that the main memory 109 stores various data and the like required for processes executed by the CPU 108, and includes a work area for the CPU 108. The CPU 108 controls the operations of the overall apparatus using the main memory 109 in accordance with operations at the control panel 110. With this control, the X-ray photographing apparatus 100 operates as follows.

The X-ray generation circuit 101 generates an X-ray beam 102 toward an object 103. The X-ray beam 102 generated by the X-ray generation circuit 101 is transmitted through the object 103 while being attenuated, and reaches the two-dimensional X-ray sensor 104, which outputs the received beam as an X-ray image (step S201). In this embodiment, an X-ray image output from the two-dimensional X-ray sensor 104 is a human body image, but the present invention is not limited to such specific image.

The data acquisition circuit 105 converts an X-ray image output from the two-dimensional X-ray sensor 104 into an electrical signal, and supplies the electrical signal to the pre-processing circuit 106. The pre-processing circuit 106 executes pre-processes such as an offset correction process, gain correction process, and the like for the signal (X-ray image signal) output from the data acquisition-circuit 105 (step S202). The X-ray image signal that has undergone the pre-processes by the pre-processing circuit 106 is transferred as a source image to the main memory 109 and image processing circuit 112 via the CPU bus 107 under the control of the CPU 108, and then undergoes a noise removal process (step S203), as will be described later.

In the image processing circuit 112, the discrete wavelet transformation circuit 116 computes the discrete wavelet transforms of the input image, and outputs wavelet coefficients for respective subbands. The threshold value processing circuit 120 sets appropriate threshold values for respective subbands, and executes threshold value processes of discrete wavelet coefficients using the set threshold values. The processing discrimination circuit 121 discriminates based on the threshold value processing results of the respective subbands if discrete wavelet coefficients of respective pixels are to be processed. The coefficient conversion circuit 117 converts discrete wavelet coefficients according to given rules (to be described later). The image processing circuit 112 also comprises the feature extraction circuit 118 for extracting a feature amount required for tone conversion, and the tone conversion circuit 119 for making tone conversion in accordance with the extracted feature amount.

Figure 3:
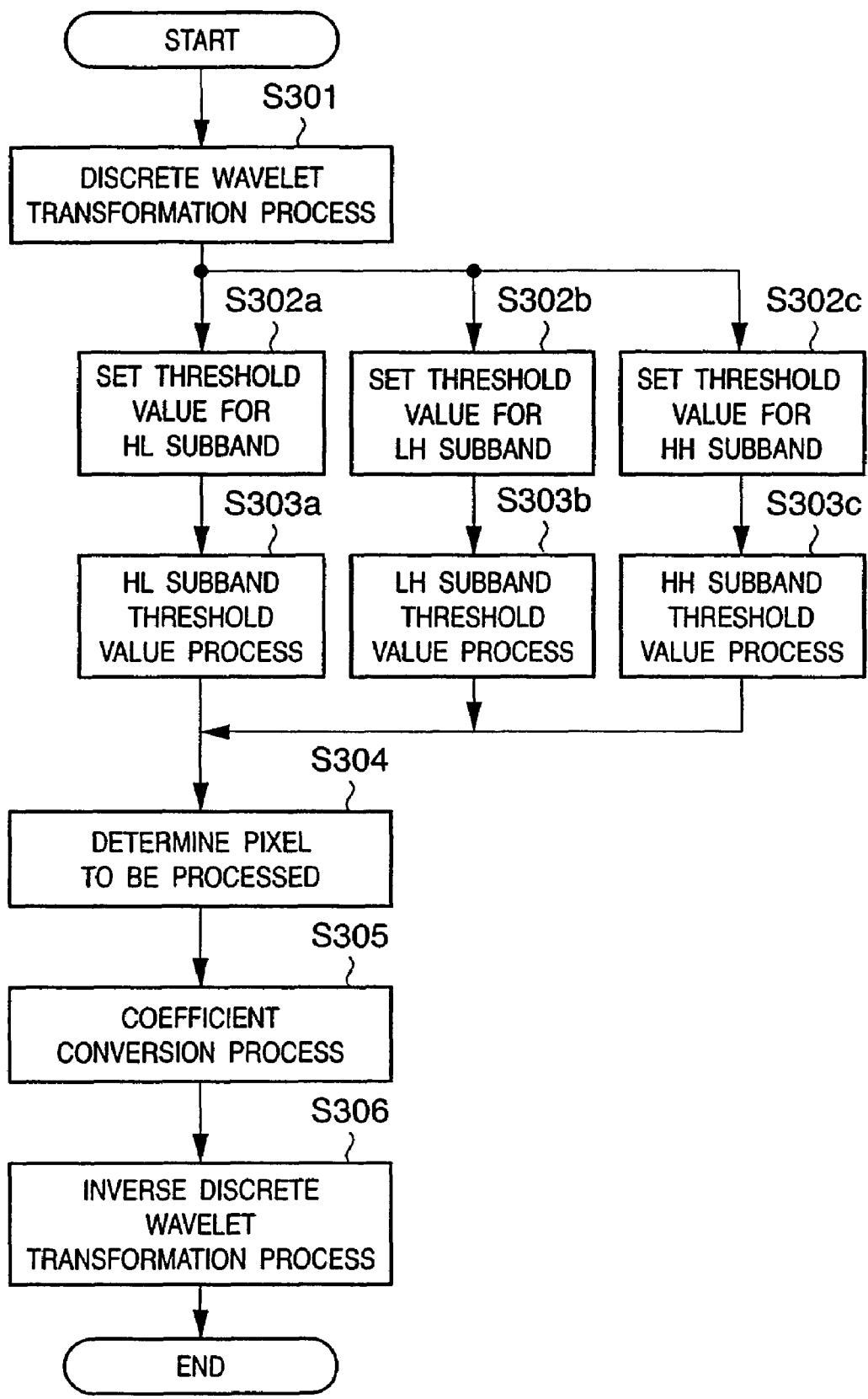
FIG. 3 is a flow chart showing the flow of processes that pertain to noise removal in an image processing circuit 112.

FIG. 3 is a flow chart showing the flow of processes that pertain to noise removal in the image processing circuit 112, and FIGS. 4A to 4D show the states of the processes. The flow of a noise removal process will be explained below using these figures.

The source image (image 401 shown in FIG. 4A), which has undergone the pre-processes by the pre-processing circuit 106, is transferred to the image processing circuit 112 via the CPU bus 107. In the image processing circuit 112, the discrete wavelet transformation circuit 116 computes the discrete wavelet transforms of the input image, and outputs discrete wavelet coefficients for respective subbands (step S301). As described above, reference numeral 401 in FIG. 4A denotes an input image; and 402 in FIG. 4B, an image that has undergone discrete wavelet transformation for one level. In the image 402, regions 403 to 406 are subbands generally called LL, HL, LH, and HH, respectively. Details of the discrete wavelet transformation will be explained later.

An appropriate threshold value is set for each of three subbands HL, LH, and HH indicating high-frequency components of those obtained in step S301 (steps S302a, 302b, and S302c). The setting method of the threshold values is not particularly limited. For example, given constants obtained by experience may be set in correspondence with the decomposition levels of discrete wavelet transformation, or the threshold values may be obtained based on statistical quantities such as averages, variances, and the like of coefficient values of the respective subbands.

Figure 4A:
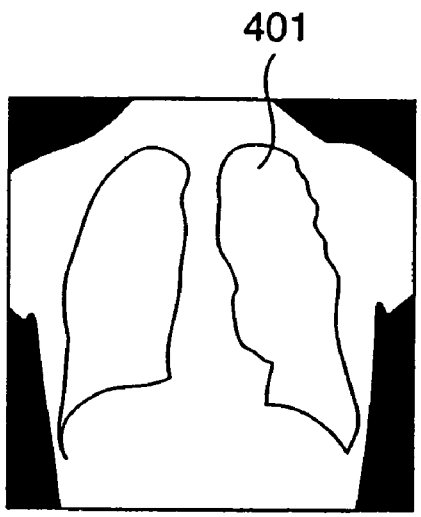
FIGS. 4A to 4D show the states of processes according to the flow chart shown in FIG. 3.
Figure 4B:
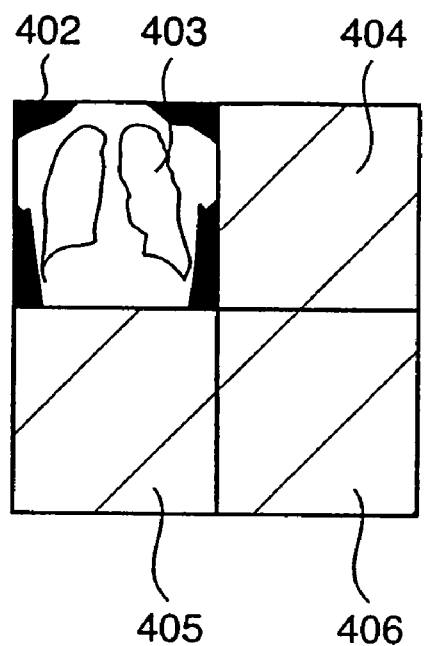
Figure 4C:
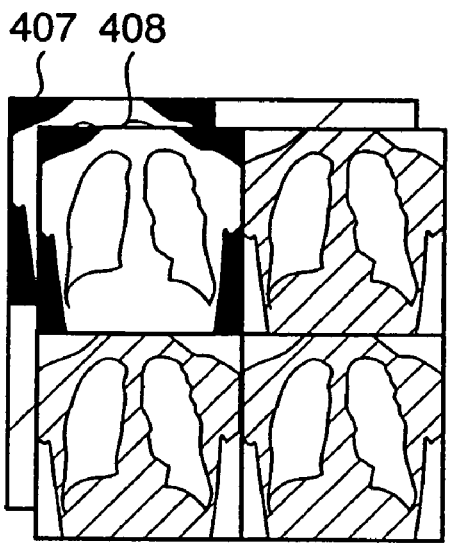

Using the threshold values of the respective subbands set in steps S302a, S302b, and S302c, wavelet coefficients of the subbands HL, LH, and HH undergo threshold value processes (steps S303a, S303b, and S303c). In FIG. 4C, reference numeral 407 denotes an image after discrete wavelet transformation obtained in step S301; and 408, an image that has undergone the threshold value processes in steps S303a, S303b, and S303c. At this time, the images 407 and 408 are held in different memory spaces. As a method of the threshold value process, for example, a signed binarization process may be used, and can be implemented as follows.

if (−THHL<HL(x,y)<THHL)
    then binary image HL(x,y)=1;
    else binary image HL(x,y)=0;
    if (−THLH<LH(x,y)<THLH)
    then binary image LH(x,y)=1;
    else binary image LH(x,y)=0;
    if (−THHH<HH(x,y)<THHH)
    then binary image HH(x,y)=1;
    else binary image HH(x,y)=0;

where THHL, THLH, and THHH are the threshold values of the respective subbands set in steps S302a, S302b, and S302c, and HL(x,y), LH(x,y), and HH(x,y) are pixel values at positions (x,y) in the respective subbands, i.e., wavelet coefficient values.

Figure 4D:
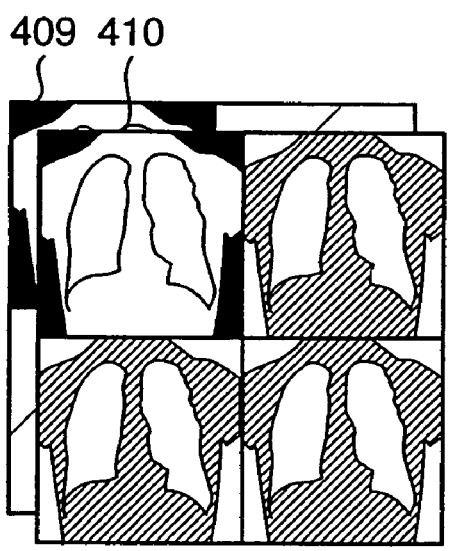

Based on the threshold value processing results of the respective subbands in steps S303a, S303b, and S303c, pixels to be processed in the subsequent coefficient conversion process are determined (step S304). Some determination methods of the pixels to be processed may be proposed. In this embodiment, the AND of binary images of the respective subbands obtained in steps S303a, S303b, and S303c is adopted. That is, the pixel to be processed is determined as follows.

if ((binary image HL(x,y)=1) AND
(binary image LH(x,y)=1) AND
(binary image HH(x,y)=1))
then binary image HL(x,y)=binary image LH(x,y)=binary image HH(x,y)=1;
else binary image HL(x,y)=binary image LH(x,y)=binary image HH(x,y)=0;

In FIG. 4D, reference numeral 409 denotes an image after discrete wavelet transformation obtained in step S301; and 410, an image indicating the pixels to be processed determined in step S304. At this time, the image 410 may be held in the same memory space as that which stores the image 408 shown in FIG. 4C. As another determination method of the pixels to be processed, a method of selecting a majority of the threshold value processing results of the respective subbands may be used.

The coefficient conversion circuit 117 executes coefficient conversion of wavelet coefficients of the respective subbands, which correspond to the pixels to be processed determined in step S304 (step S305). As an example of the process in step S305, a well-known noise removal process called wavelet degeneration may be used. Wavelet degeneration is that coefficients of respective subbands are suppressed based on a given condition. As a simplest example, when the absolute value of a coefficient value is present within a given range, a process for replacing that coefficient by 0 is done:

if (TH1≦|HH(x,y)|≦TH2) then HH(x,y)=0;
else DO NOTHING
if (TH3≦|HL(x,y)|≦TH4) then HL(x,y)=0;
else DO NOTHING
if (TH5≦|LH(x,y)|≦TH6) then LH(x,y)=0;
else DO NOTHING where TH1 to TH6 are threshold values determined independently, and are processing parameters which satisfy:
0≦TH1≦TH2
0≦TH3≦TH4
0≦TH5≦TH6

Finally, using the wavelet coefficients of the respective subbands that have been converted by the coefficient conversion circuit 117 in step S305, the discrete wavelet transformation circuit 116 computes the inverse discrete wavelet transforms to reclaim and output a noise-removed image (step S306).

In the noise removal process of this embodiment that has been explained using FIGS. 3 and FIGS. 4A to 4D, discrete wavelet transformation of one level is done. However, the present invention is not limited to this. That is, the same processes can be done for wavelet coefficients of a higher level, and also for wavelet coefficients of a plurality of levels.

The discrete wavelet transformation and inverse discrete wavelet transformation of the discrete wavelet transformation circuit 116 are well-known transformation processes, and operate as follows.

Figure 5A:
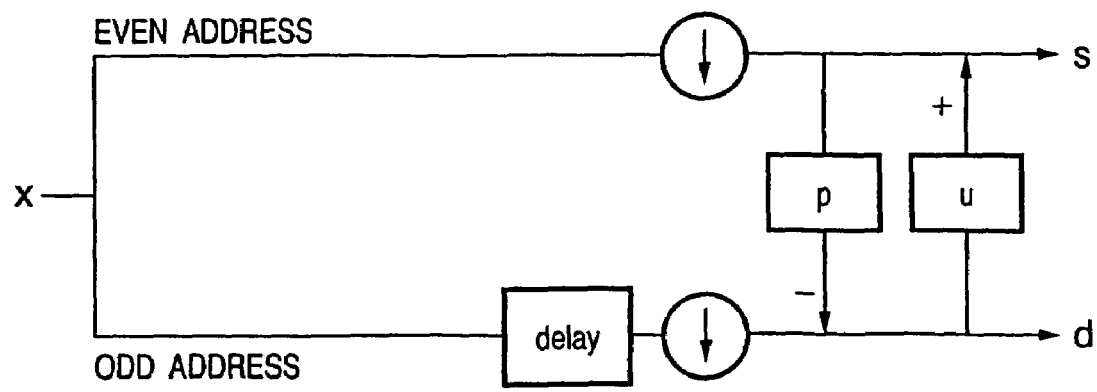
FIG. 5A is a diagram showing the arrangement of the process of a discrete wavelet transformation circuit 116.
Figure 5B:
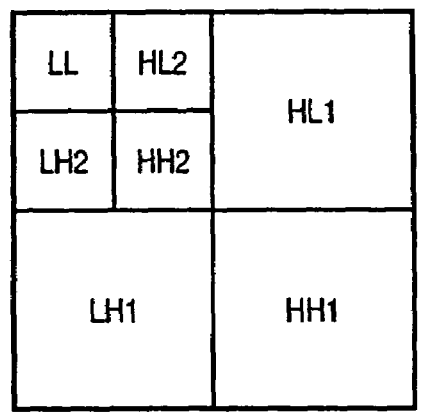
FIG. 5B shows an example of the format of transformation coefficients of two levels obtained by a two-dimensional transformation process.

The discrete wavelet transformation circuit 116 executes a two-dimensional discrete wavelet transformation process for an input image signal, and computes and outputs transformation coefficients. Image data stored in the main memory 109 is sequentially read out, undergoes transformation, and is written again in the main memory 109 by the discrete wavelet transformation circuit 116. Assume that the arrangement of the process of the discrete wavelet transformation circuit 116 in this embodiment is as shown in FIG. 5A. In FIG. 5A, an input image signal is separated into odd and even address signals by a combination of a delay element and down samplers, and undergoes filter processes of two filters p and u. In FIG. 5A, s and d represent low- and high-pass coefficients upon decomposing a linear image signal to one level, and are respectively computed by:

$$d(n)=x(2n+1)-\text{floor}((x(2n)+x(2n+2))/2) \tag{1}$$

$$s(n)=x(2n)+\text{floor}((d(n-1)+d(n))/4) \tag{2}$$

where x(n) is an image signal to be transformed. With the above process, a linear discrete wavelet transformation process is done for an image signal. Since two-dimensional discrete wavelet transformation is implemented by sequentially executing linear discrete wavelet transformation in the horizontal and vertical directions of an image and its details are known to those who are skilled in the art, a description thereof will be omitted. FIG. 5B shows an example of the format of transformation coefficient groups of two levels obtained by the two-dimensional discrete wavelet transformation process. An image signal is decomposed into coefficient sequences HH1, HL1, LH1, . . . , HH2, HL2, LH2, and LL in different frequency bands.

Figure 5C:
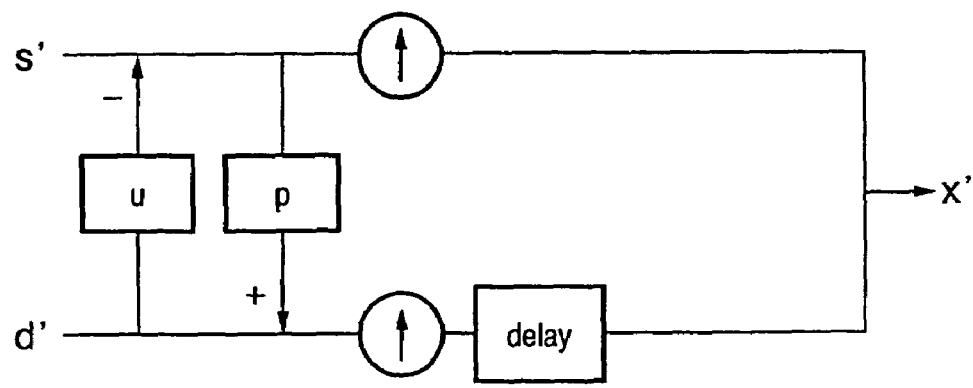
FIG. 5C is a diagram showing the arrangement of an inverse discrete wavelet transformation process by the discrete wavelet transformation circuit 116.

Likewise, inverse discrete wavelet transformation is done as follows. The transformation coefficients stored in the main memory 109 are sequentially read out, undergo transformation, and are written again in the main memory 109 by the discrete wavelet transformation circuit 116. Assume that the arrangement of the inverse discrete wavelet transformation of the discrete wavelet transformation circuit 116 in this embodiment is as shown in FIG. 5C. Input transformation coefficients undergo filter processes using two filters u and p, and are added to each other after being up-sampled, thus outputting an image signal x'. These processes are described by:

$$x'(2n)=s'(n)-\text{floor}((d'(n-1)+d'(n))/4) \tag{3}$$

$$x'(2n+1)=d'(n)+\text{floor}((x'(2n)+x'(2n+2))/2) \tag{4}$$

With the above process, linear inverse discrete wavelet transformation of transformation coefficients is done. Since two-dimensional inverse discrete wavelet transformation is implemented by sequentially executing linear inverse transformation in the horizontal and vertical directions of an image and its details are known to those who are skilled in the art, a description thereof will be omitted.

As described above, according to this embodiment, since a multiplex frequency process is implemented by discrete wavelet transformation, even when noise components are distributed to a broad frequency band, noise can be effectively removed compared to a so-called filter process that uses a single frequency band. Also, the computation cost required for the process can be greatly reduced compared to a process that simultaneously uses a plurality of filters having different sizes (i.e., different frequencies), and a process with high versatility can be done without complicated processes such as filter size adjustment and the like. Since the multiplex frequency process is done in consideration of the spatial direction of high-frequency components, for example, an edge having a direction component can be distinguished from isolated point noise having no direction component. As a result, a noise-removed image with higher quality than the conventional method can be obtained.

Second Embodiment

In steps S302a to S304 of the first embodiment, the threshold value processes for determining the pixels to be processed in step S305 are done. However, the present invention is not limited to such specific processes. In this embodiment, three subbands are compared, and the pixels to be processed in step S305 are determined according to a pattern of the comparison results. That is, by exploiting the fact that more random noise components appear in the subband HH, the processes in steps S302a to S304 may be modified as:

if ((HL(x,y)<HH(x,y)) AND (LH(x,y)<HH(x,y))
then binary image HL(x,y)=binary image LH(x,y)=binary image HH(x,y)=1;
else binary image HL(x,y)=binary image LH(x,y)=binary image HH(x,y)=0;

By combining the threshold value processes and comparison, the processes in steps S302a to S304 may be modified as follows to achieve the same object:

if (-THHH<HH(x,y)<THHH)
then binary image HH(x,y)=1;
else binary image HH(x,y)=0;
if ((HL(x,y)<HH(x,y)) AND
(LH(x,y)<HH(x,y)) AND
(binary image HH(x,y)=1))
then binary image HL(x,y)=binary image LH(x,y)=binary image HH(x,y)=1;
else binary image HL(x,y)=binary image LH(x,y)=binary image HH(x,y)=0;

Furthermore, the processes in steps S302a to S304 may adopt weighted evaluation based on distances from the threshold values, or a method of executing threshold value processes of the averages of respective subbands, and the like. A cross-reference method of the coefficients of the respective subbands is not particularly limited.

ANOTHER EMBODIMENT

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the aforementioned flow chart(s) (shown in FIG. 2 and/or FIG. 3). As described above, according to the present invention, noise removal can be efficiently done.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
   frequency transformation means for obtaining a plurality of subbands by computing frequency transforms of an image;
   determination means for determining transformation coefficients in a subband corresponding to an isolated point noise using at least two subbands of the plurality of subbands obtained by said frequency transformation means; and
   noise removal mean for removing an isolated point noise from the image,
   wherein said determination means further comprises:
      threshold value setting means for setting threshold values for at least two subbands of the plurality of subbands obtained by said frequency transformation means; and
      threshold value processing means for executing a threshold value process of transformation coefficients in the subbands for which the threshold values are set by said threshold value setting means, using the threshold values, wherein said determination means determines the transformation coefficients in the subband corresponding to an isolated point noise using a threshold value processing result of said threshold value processing means.

2. The image processing apparatus according to claim 1, wherein said threshold value setting means sets said threshold values on the basis of statistical quantities including averages or variances of transformation coefficient values in the respective subbands.

3. The image processing apparatus according to claim 1, wherein said threshold value setting means sets transformation coefficients in a predetermined subband as threshold values, and
   wherein said threshold value process of the transformation coefficients in the subbands for which said threshold values are set, using the transformation coefficients in said predetermined subband, which spatially correspond to those transformation coefficients.

4. The image processing apparatus according to claim 3, wherein the transformation coefficients in the predetermined subband have undergone a threshold value process using a predetermined threshold value.

5. The image processing apparatus according to claim 1, wherein said threshold value process is a binarization process.

6. The image processing apparatus according to claim 1, wherein said noise removal means implements noise removal by wavelet degeneration.

7. An image processing apparatus comprising:
   frequency transformation means for obtaining a plurality of subbands by computing frequency transforms of an image;

determination means for determining transformation coefficients in a subband corresponding to an isolated point noise using at least two subbands of the plurality of subbands obtained by said frequency transformation means; and noise removal mean for removing an isolated point noise from the image, wherein said frequency transformation means executes one of discrete wavelet transformation.

8. An image processing method comprising:

the frequency transformation step of obtaining a plurality of subbands by computing frequency transforms of an image;

the determination step of determining transformation coefficients in a subband corresponding to an isolated point noise using at least two subbands of the plurality of subbands obtained in the frequency transformation step; and the noise removal step of removing an isolated point noise from the image, wherein said determination step further comprises:

the threshold value setting step of setting threshold values for at least two subbands of the plurality of subbands obtained in said frequency transformation step;

the threshold value processing step of executing a threshold value process of transformation coefficients in the subbands for which the threshold values are set in said threshold value setting step, using the threshold values; and the step of determining the transformation coefficients in the subband corresponding to an isolated point noise using a threshold value processing result of said threshold value processing step.

9. The image processing method according to claim 8, wherein said threshold value setting step includes the step of setting transformation coefficients in a predetermined subband as threshold values, and wherein said threshold value processing step includes the step of executing the threshold value process of the transformation coefficients in the subbands for which said threshold values are set, using the transformation coefficients in said predetermined subband, which spatially correspond to those transformation coefficients.

10. A program, stored in executable form in a computer-readable storage medium, and comprising:

a program of the frequency transformation step of obtaining a plurality of subbands by computing frequency transforms of an image;

a program of the determination step of determining transformation coefficients in a subband corresponding to an isolated point noise using at least two subbands of the plurality of subbands obtained in the frequency transformation step; and a program of the noise removal step of removing an isolated point noise from the image, wherein the program of the determination step comprises:

a program of the threshold value setting step of setting threshold values for at least two subbands of the plurality of subbands obtained in said frequency transformation step;

a program of the threshold value processing step of executing a threshold value process of transformation coefficients in the subbands for which the threshold values are set in said threshold valuer setting step, using the threshold values; and a program of the step of determining the transformation coefficients in the subband corresponding to an isolated point noise using a threshold value processing result of said threshold value processing step.

11. A computer readable storage medium that stores a program according to claim 10.

12. A program, stored in executable form in a computer-readable storage medium, and comprising:

a program of the frequency transformation step of obtaining a plurality of subbands by computing frequency transforms of an image;

a program of the determination step of determining transformation coefficients in a subband corresponding to an isolated point noise using at least two subbands of the plurality of subbands obtained in the frequency transformation step; and a program of the noise removal step of removing an isolated point noise from the image, wherein said threshold value setting step includes the step of setting transformation coefficients in a predetermined subband as threshold values, and wherein said threshold value processing step includes the step of executing the threshold value process of the transformation coefficients in the subbands for which said threshold values are set, using the transformation coefficients in said predetermined subband, which spatially correspond to those transformation coefficients.

13. A computer readable storage medium that stores a program according to claim 12.

* * * * *

UNITED STATES PATENT AND TRADEMARK OFFICE
CERTIFICATE OF CORRECTION

| | | |
|---|---|---|
| PATENT NO. | : 7,245,776 B2 | Page 1 of 1 |
| APPLICATION NO. | : 10/941879 | |
| DATED | : July 17, 2007 | |
| INVENTOR(S) | : Tomohiko Matsuura | |

It is certified that error appears in the above-identified patent and that said Letters Patent is hereby corrected as shown below:

SHEET 1:

Figure 1, "CUP" should read --CPU--.

COLUMN 1:

Line 7, "No. 6,823,090 now allowed." should read --No. 6,823,090.--.

COLUMN 8:

Line 23, "mean" should read --means--.

COLUMN 9:

Line 6, "mean" should read --means--.

COLUMN 10:

Line 16, "valuer" should read --value--.

Signed and Sealed this

Twenty Second Day of April, 2008

JON W. DUDAS
*Director of the United States Patent and Trademark Office*